United States Patent [19]

Bucka

[11] Patent Number: 4,759,587

[45] Date of Patent: Jul. 26, 1988

[54] MANUAL OVERRIDE FOR POWER RECLINER SEAT SCREW JACK

[75] Inventor: David J. Bucka, Agoura Hills, Calif.

[73] Assignee: P. L. Porter Company, Woodland Hills, Calif.

[21] Appl. No.: 90,101

[22] Filed: Aug. 27, 1987

[51] Int. Cl.$^4$ .............................................. B60N 1/02
[52] U.S. Cl. ...................................... 297/361; 297/355
[58] Field of Search ................ 297/361, 362, 354, 355

[56] References Cited

U.S. PATENT DOCUMENTS

| | | | |
|---|---|---|---|
| 3,226,158 | 12/1965 | Strien et al. | 297/361 |
| 3,246,868 | 4/1966 | Martens et al. | 297/361 |
| 3,350,135 | 10/1967 | Martens | 297/361 |
| 3,369,841 | 2/1968 | Heyl, Jr. | 297/361 |
| 3,398,986 | 8/1968 | Homier | 297/361 |
| 4,630,866 | 12/1986 | McFarlane | 297/361 |

Primary Examiner—Francis K. Zugel
Attorney, Agent, or Firm—Beehler, Pavitt, Siegemund, Jagger, Martella & Dawes

[57] ABSTRACT

A power driven screw jack with manual override for adjusting the inclination of a pivotable backrest in a recliner seat has a housing attachable to the stationary portion of the seat and a screw attachable to the backrest. A nut threaded on the screw is normally fixed to the housing such that the screw may be motor driven to obtain axial displacement of the screw through the housing. A nut release is manually actuatable for freeing the nut from the housing, whereby the inclination of the backrest is adjustable by either turning the motor driven screw with the nut locked to the housing, or by linearly moving screw through the housing together with the nut released from the housing as by pushing on the backrest in case of power failure to the screw motor.

11 Claims, 3 Drawing Sheets

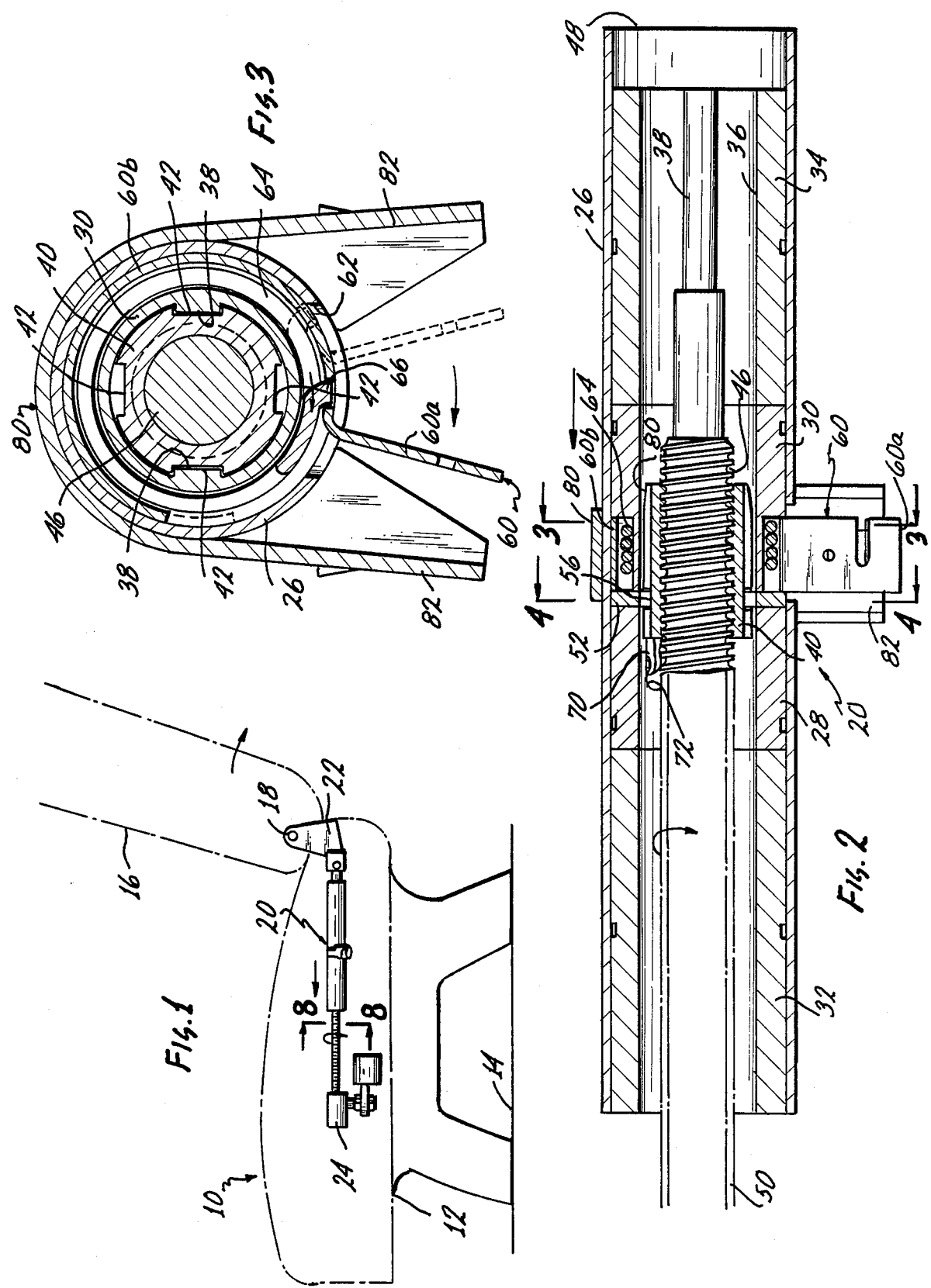

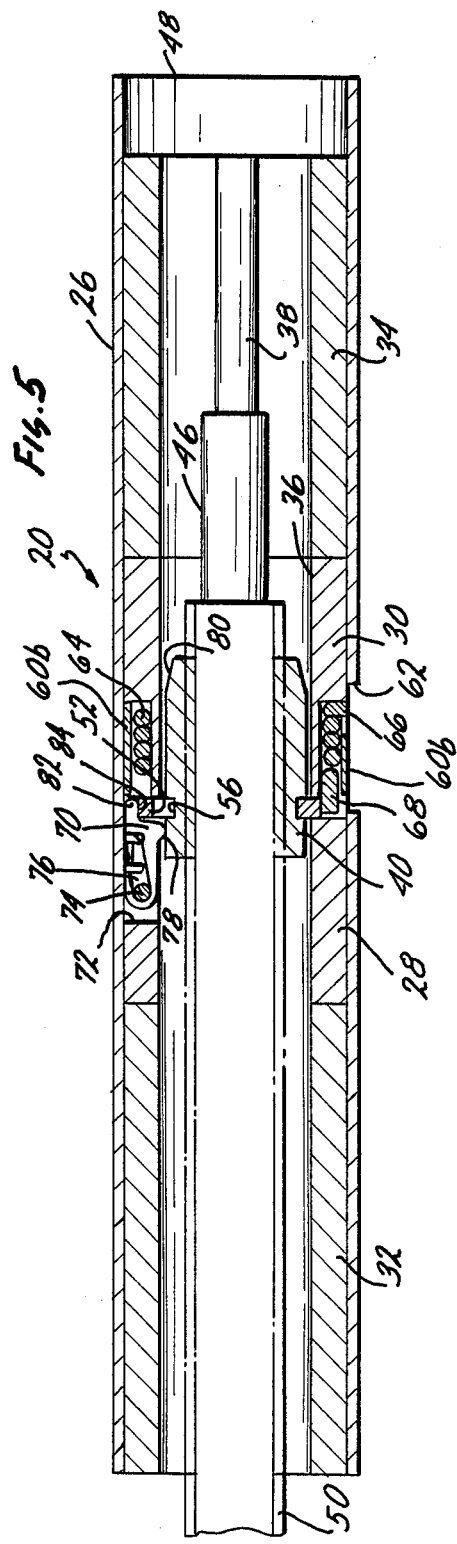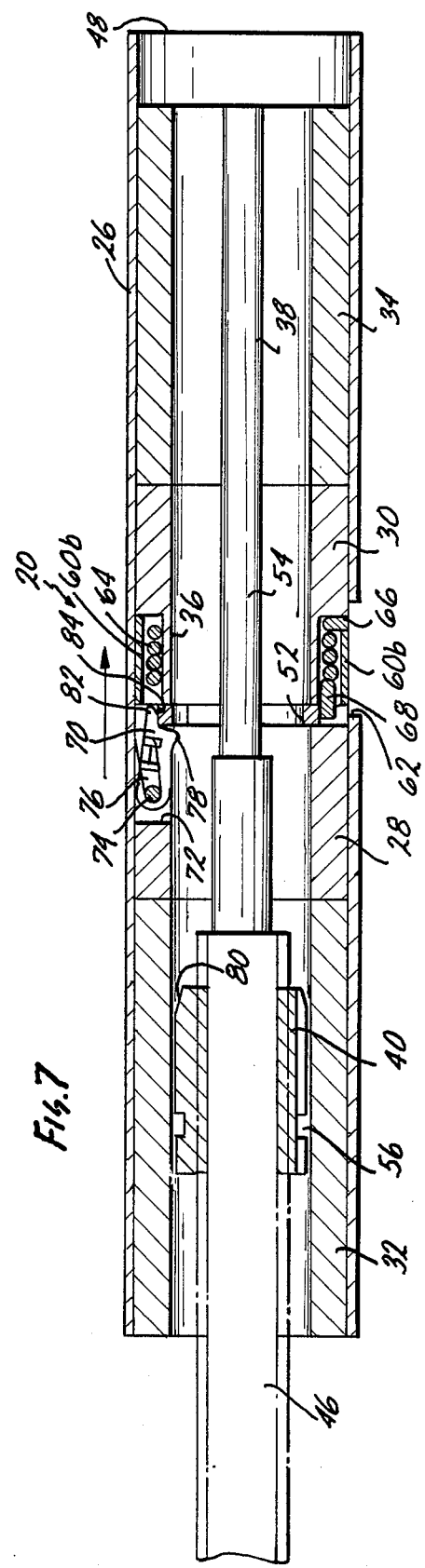

MANUAL OVERRIDE FOR POWER RECLINER SEAT SCREW JACK

BACKGROUND OF THE INVENTION

1. Field of the Invention

The present invention pertains generally to the field of reclinable seats and more particularly is directed to a screw jack which is normally motor driven for adjusting the angular position of a recliner seat and which features a manual override to permit seat adjustment in the event of motor drive failure.

2. State of the Prior Art

It is conventional to provide recliner seats with a motor driven screw jack consisting of a long threaded screw coupled at one end to a motor mounted to the stationary seat bottom, the screw being threaded through a nut or equivalent female element connected to the reclineable back of the seat by means of a pivot arm. The nut moves axially along the screw as the screw is turned by the motor drive thereby pivoting the backrest in a direction determined by the direction of screw rotation.

The use of such power drive recliner mechanisms has been limited in certain applications which require the ability to adjust the backrest position even in the event of failure of the motor drive or failure of the power supply to the same. Manual override capability is indispensable, for example, in passenger aircraft seat installations subject to Federal Aviation Agency (FAA) regulations requiring that passenger seats be in a fully upright position during take-off and landing. Although it is desirable to provide electrically powered recliner seats in passenger aircraft, and attempts have been made to provide manually overrideable power drives for the same, the cost, complexity and other shortcomings of the available devices have severely limited the extent of their usage.

One known design for an overrideable recliner screw jack employs a lateral pin inserted through the housing of the device into the nut thereby normally fixing the nut to the housing, both nut and housing traveling along the screw upon power driven rotation of the latter. In case of power failure, the pin is withdrawn thereby freeing the housing from the nut and allowing manual repositioning of the seat backrest, the housing sliding axially over both the screw and nut absent any screw rotation. This known mechanism suffers from a serious shortcoming in that transmission of axial force between the device housing and the nut occurs through the single radial pin creating torque forces between the various components which create a susceptibility to mechanical binding, uneven or premature wear and otherwise unreliable operation. A particularly frequent problem with this design is the tendency for the locking pin to become wedged in place between the housing and the nut such that it becomes very difficult or impossible to extract it when it is necessary to do so.

Other power driven recliner screw jacks with manual override are available from European sources, and these are manufactured and assembled to very close tolerances in order to achieve the necessary reliability, but because of the high precision components used these devices are costly.

A continuing need therefore exists for a lower cost but reliable and efficient power driven recliner screw jack with manual override capability.

SUMMARY OF THE INVENTION

This invention addresses the aforementioned needs by providing a manually overridable screw jack for recliner seats of the type having a backrest pivoted to a seat bottom. The novel screw jack has a housing attachable to either the movable backrest or the stationary seat bottom, a screw attachable at one of its ends to the other of the seat bottom or the backrest, and an acme nut threaded on the screw. The nut slides within a bore in the device housing along longitudinal ridges which hold the nut against rotation. A locking element normally fixes the nut to the housing such that in a normal power driven condition of the device, both the nut and housing travel axially along the screw when the screw is turned about its axis. A manually actuatable release disengages the stop element to free the nut from the housing, whereupon the backrest is essentially free to pivot and its inclination can be easily readjusted by merely pushing on the backrest in the desired direction. Pivotal movement of the backrest causes the housing to move axially relative to the screw while the nut remains stationary on the screw. The relative position of the backrest and seat bottom are therefore adjustable by either turning the screw with the nut locked to the housing in a normal state of the device, or by linearly moving the screw and nut together through the housing in a manually overriden state of the mechanism.

A preferred locking element is a ring axially fixed to the housing and rotatable about the screw axis between a normal engaged position and a manual override or release position. The ring has at least two diametrically opposed tabs which extend into a circumferential groove formed in the acme nut. In the release position of the ring, the tabs are aligned with longitudinal slots formed in the nut allowing the nut to pass freely through the ring together with the screw. In the normal engaged position of the ring however, the tabs lie between the slots and engage the shoulders of the circumferential nut groove, thus axially fixing the nut to the housing for transferring axial force between the screw and the housing. The tabs are arranged in a circumferentially symmetrical pattern so that the axial force transfer is balanced without creating torque force components which would tend to twist, misalign or bind any portion of the screw jack mechanism.

The nut is preferably relatively short in axial direction and it therefore becomes axially separated from the locking ring when the backrest is manually repositioned and the screw carries the nut away from the ring. In order to facilitate re-engagement of the nut and locking ring, the ring is retained against rotation and secured in the release position by a cam element sensitive to correct axial alignment of the locking ring with the circumferential nut groove. Unless such alignment exists, the cam element moves under spring bias to a ring engaging position in which the ring is held against rotation and secured in its released position thereby maintaining the ring tabs in circumferential alignment with the axial slots in the nut to permit re-engagement of the nut and ring following axial separation of the two.

The locking ring is rotated between its normal and release positions by a manually operated actuator element such as a lever mounted on the housing and movable radially between a normal and a release position. In a typical recliner seat installation emplying the screw jack of this invention, it will be found that upon attempted rotation of the locking ring to the release position the ring may be tightly held against rotation by frictional forces due to the weight of the seat backrest bearing against the locking ring and forcing the same against the housing and the nut. This frictional engagement may be broken by jiggling the backrest forward and backwards while applying actuating force to the lever until the ring turns in the desired direction. Tactile feedback of positive lever acutation prior to disengagement rotation of the ring may be provided by interposing a spring between the actuating lever and the locking ring so as to allow lever movement from one position to another notwithstanding the frictional engagement of the ring. Under such circumstances, the lever is manually moved to and held in the desired position such that an actuating bias is transmitted through the spring to the locking ring so long as the lever is held in the desired new state of the mechanism. The backrest is then jiggled to free the locking ring which then responds to the spring bias by moving to the desired new state, both lever and locking ring thereafter remaining stably in the new position.

These and other advantages of the present invention will be better understood from the detailed description of the preferred embodiment set forth below with reference to the accompanying drawings.

BRIEF DESCRIPTION OF THE DRAWINGS

FIG. 1 is a side elevational view of a typical recliner seat in phantom lining illustrating an exemplary installation of the novel screw jack;

FIG. 2 is a first longitudinal section of the novel screw jack in its normal power driven state;

FIG. 3 is a first axial cross-section of the screw jack taken along line 3—3 in FIG. 2;

FIG. 5 is a second longitudinal section taken along line 5—5 in FIG. 4 also showing the screw jack in its normal power driven state;

FIG. 7 is a longitudinal section as in FIG. 5 showing the screw jack in manual override mode with the acme nut axially separated from the locking ring by movement of the screw relative to the housing;

DETAILED DESCRIPTION OF THE PREFERRED EMBODIMENT

Figure 4:
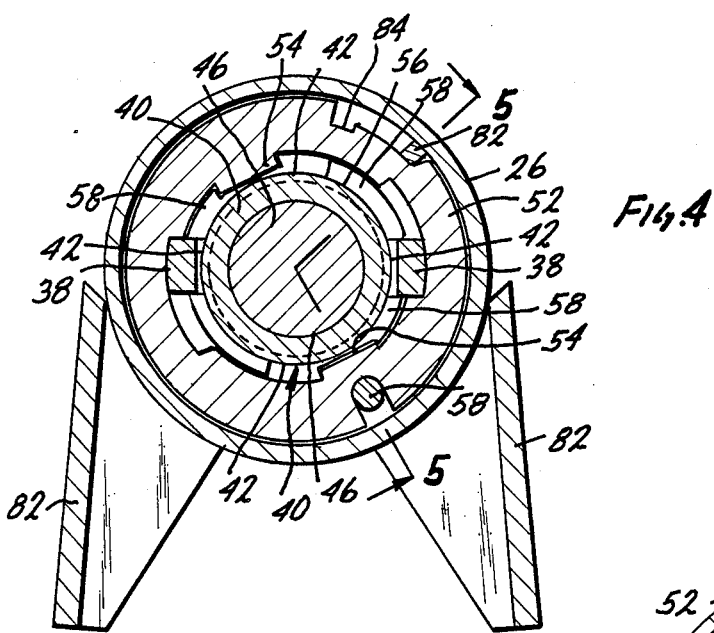
FIG. 4 is a second axial cross-section of the screw jack taken along line 4—4 in FIG. 2.

With reference to the drawings, FIG. 1 shows a typical recliner seat 10 which includes a seat bottom 12 stationary on an underlying supporting surface 14 and a reclineable backrest 16 hinged to the seat bottom 12 at pivot point 18. The novel screw jack 20 is connected between the end of a pivot arm 22 fixed to the reclineable backrest 16 and an electric motor drive 24 mounted to the seat bottom 12.

Turn now to FIG. 2 which shows the screw jack 20 in longitudinal section. The screw jack has a tubular housing 26 within which are fixed as by swaging four axially aligned cylindrical bushings including inner bushings 28, 30 and outer bushings 32, 34. The four bushings define a continuous cylindrical bore 36 into which project two diametrically opposite longitudinal ridges 38 formed integrally with the four bushings as shown in FIG. 3 and extending continuously the full length of the bore 36. An acme nut 40 has a generally cylindrical body with four circumferentially equidistant axially oriented slots 42 in its outer surface. Two opposite slots 42 mate with the ridges 38, holding the nut against rotation in bore 36 but allowing the nut 40 to slide freely in an axial direction through the four bushings as best seen in FIG. 3. A long screw 46 is threaded at its inner end through the interior of the acme nut 40, and its opposite outer end 50 protrudes from the housing 26. The screw jack 20 is installed in the seat 10 by fixing the end 48 of the housing to the backrest via end of backrest pivot arm 22, while the opposite outer end 50 of the screw 46 is secured to the seat bottom.

The nut 40 is normally locked in an axial direction to the housing 26 by a locking ring 52 which is itself axially held between the two inner bushings 28, 30. The ring 52 as best seen in FIG. 4 has two diametrically opposite inwardly extending tabs 54 which normally lie within a circumferential groove 56 defined in the acme nut 40, as best appreciated from FIGS. 2 and 3. In the normal, engaged condition of the locking ring 52 illustrated in FIG. 4 the ring tabs 54 are circumferentially intermediate the axial slots 42 in the nut and engage the shoulders 58 of the nut groove 56 between the slots 42, thereby locking the nut 40 against axial travel through the bore 36. In this normal condition of the screw jack 20, the housing 26 travels together with the nut 40 when the screw 46 is turned by the drive motor 24, thus pushing or pulling on the end of the pivot arm 22 to adjust the angular position of the backrest 16 relative to the seat bottom 12.

Release actuating lever 60 includes a radially extending outer portion 60a which protrudes through a window 62 in the housing 26 and a circumferential inner portion 60b which is rotatable within the housing 26 about the bushing 30 in response to actuating force applied to the outer portion 60a. A helical coil spring 64 is contained concentrically between the bushing 30 and the cylindrically curved inner portion 60b of the actuating lever. One end 66 of the coil spring is engaged to the actuating lever 60 as shown in FIG. 3 while the opposite end 68 is engaged to the locking ring 52 as seen in FIG. 4. The spring 64 transmits an actuating bias from the lever 60 to the locking ring when the lever 60 is moved from its normal position shown in dotted lining in FIG. 3 to a release position shown in solid lining in the same figure, tending to rotate the locking ring 52 clockwise from its normal, locked position of FIG. 4 to a release or manual override position shown in FIG. 6. In this release position the locking ring tabe 54 are circumferentially aligned with the axial slots 42 in the acme nut permitting free axial displacement of the nut 40 through the locking ring 52. In this condition the nut 40 is no longer fixed to the housing 26 and rotation of the drive screw 46 is no longer effective for axially displacing the housing 26 relative to the screw and is therefore inoperative for repositioning the backrest 16. The backrest 16, however, is now free to respond to manually applied pivotal force. In other words, the backrest 16 can be manually repositioned and in particular can be manually pushed to a fully erect position from a reclined position in the event of power failure or mechanical failure of the drive motor 24. By pushing up on the backrest 16, the lower end of pivot arm 22 in FIG.

1 swings backward and pulls the housing 26 in a direction away from the screw 46 while the acme nut 40 remains stationary on the screw 46. The locking ring 52 travels with the housing 26 and the ring tabs 54 move through the axial slots 42 on the acme nut until the nut 40 is axially withdrawn from the ring 52 as shown in FIG. 7.

Figure 6:
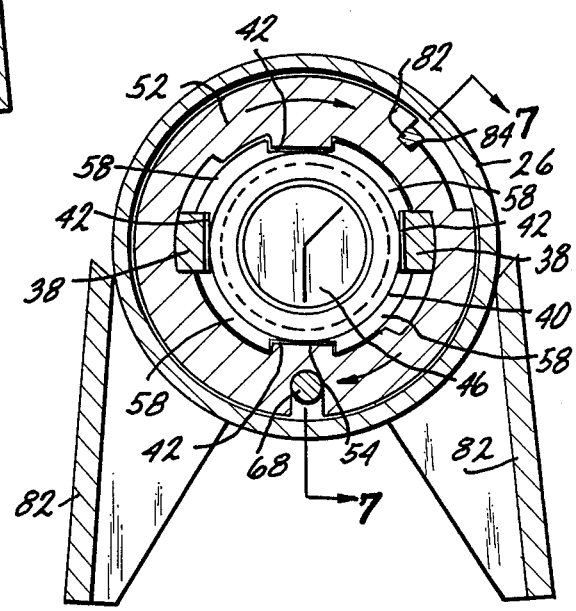
FIG. 6 is an axial cross-section similar to that of FIG. 4 but showing the locking ring rotated to its release position allowing for manual override of the device and showing the locking ring tabs in alignment with the slotted nut to permit re-engagement of the two following axial separation as in FIG. 7.
Figure 8:
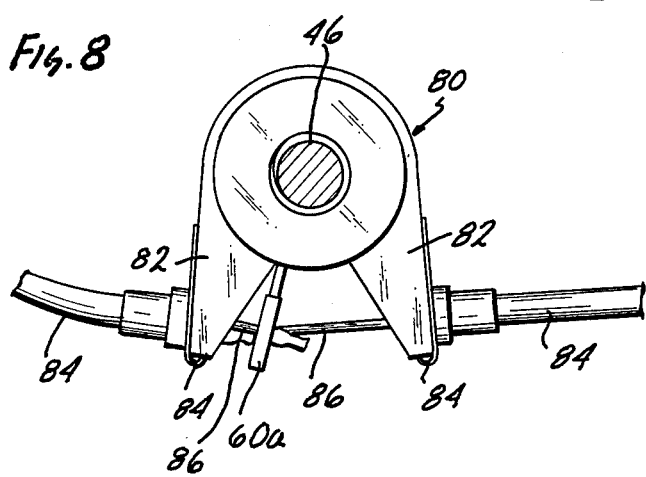
FIG. 8 is an axial perspective end view of the screw jack showing a typical connection of a Bowden cable for remote actuation of the device.

To ensure easy re-engagement of the locking ring 52 with the acme nut 40, the ring 52 is retained in the release position of FIG. 6 by a cam element 70 which is mounted within a recess 72 defined in the housing 28. The cam element is pivoted at 74 and biased by spring 76 towards clockwise rotation in FIGS. 5 and 6 such that the lower cam surface 78 is urged against the outer cylindrical surface of the acme nut 40. While the nut groove 56 is aligned with the locking ring 52, the cam 70 is supported against the spring bias in a normal raised position shown in FIG. 5 in which the locking ring 52 is free to rotate within the groove 56. As the nut 40 is axially withdrawn from the locking ring, the locking ring is initially constrained against rotation within the housing 26 by the interlocking of tabs 54 within nut slots 42. However, once the nut is fully withdrawn and axially separated from the locking ring, the ring would be free to rotate away from the release position of FIG. 6 thereby creating a misaligned condition between the tabs 54 and the nut slots 42, and making re-engagement of nut and ring impossible until again re-aligned, which would be difficult to do by sense of feel alone. In order to avoid this difficulty, the cam end 78 of element 70 follows the nut surface and drops into the bore 36 under bias of spring 76 just prior to withdrawal of the nut from the locking ring 52 moving the rip 82 of the cam element into notch 84 of the locking ring. The cam end 78 follows the tapered end 80 at the left hand end of the acme nut in the drawings as the nut moves to the right away from the locking ring 52 lowering the tip 82 into the ring notch 84 before the nut 40 separates from the ring 52. If the nut 40 moves to the left as in FIG. 7, the reduced outer diameter 85 at the right end of the nut 40 allows the cam 78 to move into the bore 36 and the tip 82 to move into the ring notch 84 before the nut separates from the ring 52. For either direction of nut separation the locking ring 52 is therefore held with tabs 54 in circumferential alignment with nut grooves 42 so long as the nut 40 is axially separated from the ring to thereby permit ready axial re-engagement between the two elements.

In practice, it will be found that the weight of the backrest 16 transmitted axially through the housing 26 creates considerable frictional engagement of the locking ring tabs 54 with the shoulders 58 of the acme nut and between the ring 52 with the end surfaces of the inner bushings 30 and 28. It will usually be very difficult to overcome this friction and rotate the locking ring 52 from its normal to its release position merely by actuating the lever 60. The backrest 16 can be jiggled or rocked lightly forwards and backwards in order to release the ring 52 so that it will rotate in response to the actuating force. If the actuating lever 60 were rigidly connected to the locking ring 52 it would be impossible in most cases to move the lever 60 until after freeing the ring 52 for rotation with the lever. In order to provide more positive tactile feedback and generally easier operation of the device, the lever 60 is operatively connected to the locking ring 52 by means of the spring 64 in the manner already described such that an actuating bias is transmitted by the spring upon movement of the actuating lever 60 between its normal and released positions. The actuating lever assembly is bistable in the sense that when the lever 60 is first moved from normal to release position unwinding the coils of spring 64 the lever must be held against the resultant spring bias until the locking ring 52 has rotated to the desired position in response to the actuating bias. Upon rotation of the locking ring to this new position, the lever 60 also remains stably in the new position. The reverse process is carried out to return the ring 52 to its original state, i.e. moving the lever 60 counterclockwise in FIG. 3 tending to now wind the coil spring 64 and thus agains supplying a spring bias, until the locking ring rotates to remove this bias and both rings 52 and lever 60 remain stably in the new position.

The locking ring tabs 38 are diametrically opposed to each other and in the normal engaged position of the locking ring 52 transmit axial force between the housing 26 and the acme nut 40 in a circumferentially balanced, symmetrical manner without creating torque force components tending to misalign the axial arrangement of the screw 46, nut 40, bushings 28-34 and housing 26. The balanced transmission of axial forces minimizes the possibility of mechanical binding of the various component parts and is conducive to smooth and reliable operation of the screw jack mechanism.

A U-shape clip 80 fits around the housing 26 with the two clip legs 82 lying on either side of the lever 60. The sleeve ends of two Bowden cables 84 are secured one to each leg 82 by means of retainer clips 84, while the inner wires 86 of each cable 84 are secured at their ends to the lever 60a by means of enlarged terminations 88 in a conventional manner. The lever 60a may be pulled towards one or the other leg 82 i.e. between its normal and release positions in response to relative pulling force between the inner wire 86 and outer sleeve of the corresponding cable 82, the relative pulling force being applied by a suitable remote actuator not shown in the drawings.

While a particular embodiment of the invention has been described and illustrated for purposes of clarity and explanation, it must be understood that many changes, substitutions and modifications to the described embodiment will become apparent to those possessed of ordinary skill in the art without thereby departing from the spirit and scope of the present invention which is limited only by the following claims.

What is claimed is:

1. A screw jack for a recliner seat of the type having a seat portion and a pivotable backrest portion, said screw jack comprising:

a housing attachment to one of said seat or said backrest;

a screw attacheable at one of its ends to the other of said seat or said backrest;

a nut threaded on said screw;

stop means normally fixing said nut to said housing whereby said screw may be power driven to obtain axial displacement of said screw through said housing; and release means manually actuatable for disengaging said stop means and freeing said nut for joint translation with said screw through said housing;

whereby the relative position of said backrest and seat portions are adjustable by either turning said screw with said nut locked to said housing or by linearly moving said screw through said housing together with the nut released from the housing;

said stop means engaging said nut symmetrically about the nut axis so as to transfer axial force between said screw and said housing through said nut in diametrically balanced manner without torque components acting on the nut.

2. The device of claim 1 wherein said release means are rotatable about the screw axis between a released and an engaged position.

3. A screw jack for a recliner seat of the type having a seat portion and a pivotable backrest portion, said screw jack comprising:
   a housing attacheable to one of said seat or said backrest;
   a screw extending through said housing and attacheable at one of its ends to the other of said seat or said backrest;
   a nut threaded on said screw within said housing; and
   lock means rotatable about the screw axis between a normal engaged position axially fixing said nut to said housing and a released position freeing said nut for joint translation with said screw through said housing, said lock means engaging said nut symmetrically about the nut axis so as to transfer axial force between said screw and said housing through said nut in diametrically balanced manner without torque components acting on the nut;
   whereby the relative position of said backrest and seat portions are angularly adjustable by either turning said screw with said nut locked to said housing in said engaged position of the lock means, or by axially moving said screw through said housing together with said nut in said released position of the lock means.

4. The device of claim 3 wherein said lock means comprises a ring axially fixed to said housing and having a plurality of inwardly extending tabs rotatable within a circumferential groove in said nut between said locked and released positions, said tabs aligning with axial slots in said nut so that the nut may pass through said ring in said released position of the ring, said tabs engaging the shoulder of said circumferential groove between said slots in the locked position of the ring thus axially fixing the nut to the housing.

5. The device of claim 4 further comprising stop means operative for locking said ring in said released position absent axial alignment between said circumferential groove and said ring tabs.

6. The device of claim 5 wherein said stop means comprise cam means on said housing spring biased towards a nut engaging position for locking the nut against rotation, said nut holding said cam means against said bias in a disengaged position while said circumferential groove is axially aligned with said ring tabs.

7. The device of claim 3 wherein said ring is movable between said engaged and released positions by remote actuator means operatively connected through flexible cable release means.

8. The device of claim 4 further comprising actuating means manually movable between a normal and a release position and connected by spring means for transmitting an actuating bias tending to rotate the ring between said engaged and released positions.

9. A screw jack for a recliner seat of the type having a seat portion and a pivotable backrest portion, said screw jack comprising:
   a housing attacheable to one of said seat or said backrest;
   a screw extending through said housing and attacheable at one of its ends to the other of said seat or said backrest;
   a nut threaded on said screw and held against rotation within said housing; and
   a ring axially fixed to said housing rotatable about the screw axis between a normal engaged position and a released position, said ring having a plurality of inwardly extending tabs rotatable within a circumferential groove in said nut between said locked and released positions, said tabs aligning with axial slots in said nut so that the nut may pass through said ring with said screw in said released position of the ring, said tabs engaging the shoulder of said circumferential groove between said slots in the locked position of the ring in a circumferentially symmetrical pattern thus axially fixing the nut to the housing to transfer axial force between said screw and said housing through said nut without torque components acting on the nut;
   whereby the relative position of said backrest and seat portions are angularly adjustable by either turning said screw with said nut locked to said housing in said engaged position of the lock means, or by axially moving said screw through said housing together with said nut in said released position of the lock means.

10. The device of claim 9 further comprising cam means pivoted to said housing and spring biased towards a ring engaging position for locking the ring against rotation, said nut being configured to hold said cam means against said bias in a disengaged position while said circumferential groove is axially aligned with said ring tabs thereby allowing rotation of the ring.

11. The device of claim 9 further comprising lever means mounted to said housing for radial movement between first and second positions and spring means connected between said lever and said ring for transmitting an actuating bias to said ring in response to movement of said lever means between said positions.

* * * * *

UNITED STATES PATENT AND TRADEMARK OFFICE
CERTIFICATE OF CORRECTION

PATENT NO. : 4,759,587

DATED : July 26, 1988

INVENTOR(S) : David J. Bucka

It is certified that error appears in the above—identified patent and that said Letters Patent is hereby corrected as shown below:

The correct orientation of the nut 40 in Figures 2, 5 and 7, which is properly described in the specification, should show the tapered end 80 on the left hand side in each of the referenced figures.

Signed and Sealed this

Fourteenth Day of March, 1989

Attest:

DONALD J. QUIGG

*Attesting Officer*  *Commissioner of Patents and Trademarks*